US 8,774,386 B2

(12) United States Patent
Gray et al.

(10) Patent No.: US 8,774,386 B2
(45) Date of Patent: Jul. 8, 2014

(54) SYSTEM AND METHOD FOR CALL INITIATION USING AVAILABILITY INFORMATION

(75) Inventors: Thomas A. Gray, Fort Coulonge (CA); Peter Francis Couse, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1354 days.

(21) Appl. No.: 11/680,811

(22) Filed: Mar. 1, 2007

(65) Prior Publication Data

US 2008/0212762 A1 Sep. 4, 2008

(51) Int. Cl.
*H04M 3/42* (2006.01)

(52) U.S. Cl.
USPC .................................. 379/211.01; 379/211.02

(58) Field of Classification Search
USPC ............................ 379/201.01, 211.01, 211.02
See application file for complete search history.

(56) References Cited

U.S. PATENT DOCUMENTS

| | | | |
|---|---|---|---|
| 6,363,143 B1 | 3/2002 | Fox | |
| 6,404,874 B1 * | 6/2002 | Chestnut | 379/211.02 |
| 6,463,145 B1 * | 10/2002 | O'Neal et al. | 379/211.02 |
| 6,807,423 B1 | 10/2004 | Armstrong et al. | |
| 7,088,810 B1 * | 8/2006 | Burg | 379/201.02 |
| 8,036,362 B1 * | 10/2011 | Skinner | 379/211.02 |
| 2003/0040332 A1 * | 2/2003 | Swartz et al. | 455/553 |
| 2006/0193460 A1 * | 8/2006 | Cadiz et al. | 379/211.02 |
| 2007/0165827 A1 * | 7/2007 | Worsham et al. | 379/221.08 |
| 2010/0166162 A1 * | 7/2010 | Mueller et al. | 379/93.01 |

FOREIGN PATENT DOCUMENTS

| | | |
|---|---|---|
| CN | 1394061 A | 1/2003 |
| WO | WO 99/05845 A1 | 2/1999 |
| WO | WO 2005/029889 A1 | 3/2005 |

* cited by examiner

*Primary Examiner* — Sonia Gay

(57) ABSTRACT

A system and method are provided for initiating a call to an intended called party on one or more alternate numbers based on availability of the called party, as determined by the called party's presence server or other database. If the called party is determined to be 'not available' and does not have any useful forwarding features enabled on his/her primary line served by a primary number, calls are attempted on one or more alternate numbers rather than on the primary number.

18 Claims, 2 Drawing Sheets

SYSTEM AND METHOD FOR CALL INITIATION USING AVAILABILITY INFORMATION

FIELD OF THE INVENTION

The present invention relates in general to communication systems, and more particularly to a system and method for initiating calls using availability information

BACKGROUND OF THE INVENTION

Presence services are an emerging technology that provide information of user's availability and capabilities. Such presence services are primarily used for providing availability information of one or more users to another user of a system. This availability information includes an indication of availability or willingness of the user to engage in immediate communication. For example, Microsoft® Live Communication Server (LCS) may be configured to provide availability indicators in desktop computer applications or smart telephony device applications such that a user is provided with availability information of another user, prior to initiating communication, such as making a telephone call.

It is common for users to have multiple contact addresses for real-time voice and multi-media connections. For example, a business person may be reached via his/her business telephone number, cell phone or wireless PDA number, home number or VoIP number. Any of these numbers may appear on the user's business card and may be used to set up synchronous voice connections to the user, but the business card provides no guidance for a caller as to which number is suitable at any particular time. Since calls initiated using some numbers (e.g. home) may be more intrusive than others (e.g. office) a caller must rely on his/her own social and business judgment as to which number to try first. For example, a caller may not hesitate to telephone an individual any time at his/her business number but would be hesitant to call a home number after hours for anything other than an emergency. All of the foregoing give rise to a form of 'telephone tag', as callers try one number after another in an attempt to reach the user.

Call Forward Always and Call Forward No Answer are common PBX features that allow a user who will not be available at his/her main business number to forward incoming calls to a more suitable location. Filtering rules may be used to permit calls from certain callers (identify by Caller Line ID) in certain contexts to be forwarded to more appropriate destinations, such as described in United States Patent Application Publication 2005/0100157 dated May 12, 2005, entitled Context Aware Call Handling System. However this requires the called party to program suitable filtering rules.

In SIP systems, it is possible for the called party to send a "redirect" message to the calling party at the time the call is originated. Instead of locally forwarding the call, the called party sends a message containing another address that it wishes the call be redirected to.

It is also known in VoIP and other systems to provide a "one number" feature whereby the user publishes only one number for contact purposes. When that number is called, system logic directs the call to one or more physical numbers that are selected according to the called party's preferences.

Call coverage lists are similar to the "one number" feature whereby a called party programs lists of numbers to which an incoming call can be redirected, either in parallel or sequentially. The sequential call redirection is most common, whereby a list of numbers is provided to which an incoming call is redirected in sequence on the occurrence of no answer on each successive number. Thus a user may set a path starting with his/her desk phone, then his/her cell phone, his/her assistant's phone and finally his/her voicemail.

Call redirection and "one number" features are relatively new to VoIP systems and it will be several years before these systems and their features become common place. Call coverage systems are not supplied by all switch manufactures. Call forwarding relies on the called party to remember to set his forwarding options properly, which is commonly not done.

SUMMARY OF THE INVENTION

According to one aspect, a method and system are provided for initiating a call to an intended called party on one or more alternate numbers based on availability of the called party, as determined by the called party's IM presence server or other database. If the called party is determined to be 'not available' and does not have any useful forwarding features enabled on his/her primary line served by a primary number, calls are attempted on one or more alternate numbers rather than on the primary number.

According to another aspect, the alternate numbers may be stored and indexed by availability status associated with a speed dial feature. Also, the called party may be notified by a special tone or display that a more intrusive endpoint is being called.

BRIEF DESCRIPTION OF THE DRAWINGS

Embodiments of the present invention will now be described, by way of example only, with reference to the attached Figures, wherein.

DETAILED DESCRIPTION OF THE INVENTION

Figure 1:
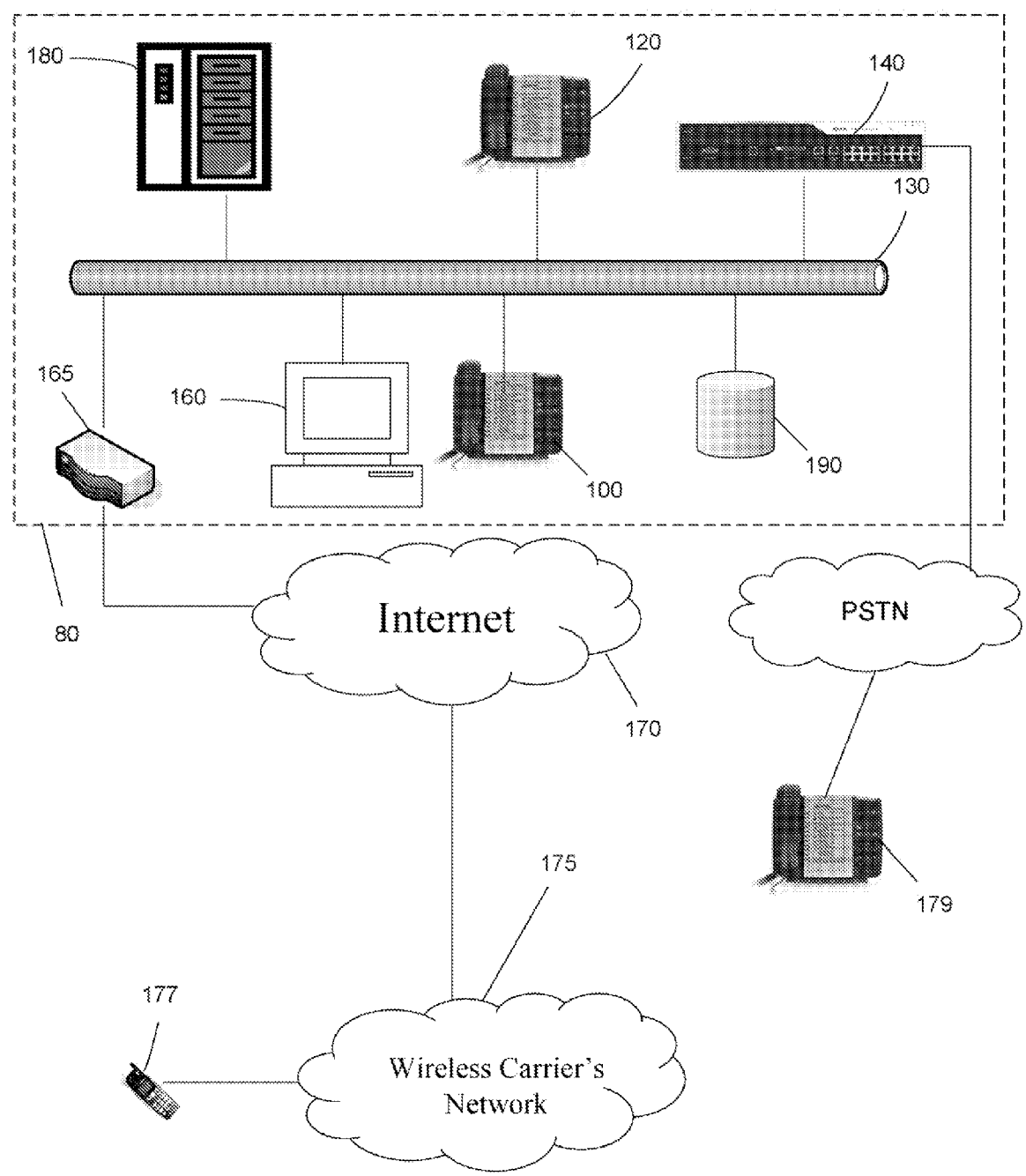
FIG. 1 is a simplified representation of a communication system for implementing a method for initiating calls using availability information, according to one embodiment of the present invention.

Reference is first made to FIG. 1 showing a communication system 80 for implementing a method for initiating calls using availability information, according to an embodiment. As shown, a first telephone device 100 of a first user and a second telephone device 120 of a second user are both connected via a local area network 130 to a telephony switch 140 that is responsible for telephony connections between the first telephone device 100 and the second telephone device 120, as well as outside connections over the PSTN. The first telephone device 100 is associated with a PC 160 having software for integrating with the telephony switch 140 over LAN 130 (or directly connected to telephony device 100 using suitable APIs) to provide an interface for controlling collaborative communication features of the device 120 and PC 160 (e.g. Microsoft® Office Communicator). The user at telephone device 100 uses PC 160 to activate features and specify preferences.

A router 165 connects the LAN 130 to the Internet 170 in a conventional manner. The Internet 170 may be connected to a wireless network 175 for communication with a cellular telephone 177, for having an alternate number for contacting the user at telephone device 100.

Likewise, the user may be contacted at home by routing calls over the PSTN to a further alternate number that is mapped to the users home telephone 179.

A presence server 180 (e.g. Microsoft® LCS, Lotus® SameTime, etc.) provides presence status information to the telephone devices 100 and 120 and/or the software client on PC 160 relating to the availability of the users. It will be appreciated by those skilled in the art that the presence server 180 provides presence information by monitoring devices and applications to determine a user's presence. A database 190 is also connected to the LAN 130 in which alternate numbers are stored for a called party, as discussed in greater detail below.

For the purpose of simplicity, only two telephone devices, the first telephone device 100 and the second telephone device 120, are shown. It will be appreciated that many other telephone devices and additional PCs can be connected to the LAN 130. It will also be appreciated that the telephony switch 140 can be any switch that handles connections between telephone devices.

For the purpose of the present example, the first telephone device 100 is a desk telephone connected to the telephony switch 140. Similarly, the second telephone device 120 is a desk telephone locally connected to the telephony switch 140 via LAN 130. However, the second telephone device 120 may be remotely located and connected to the telephony switch 140 over the Internet, via a VPN connection, or the like. Thus, the LAN 130 may be replaced by any suitable communications network, including the Internet, corporate Intranet, cellular network etc.

Figure 2:
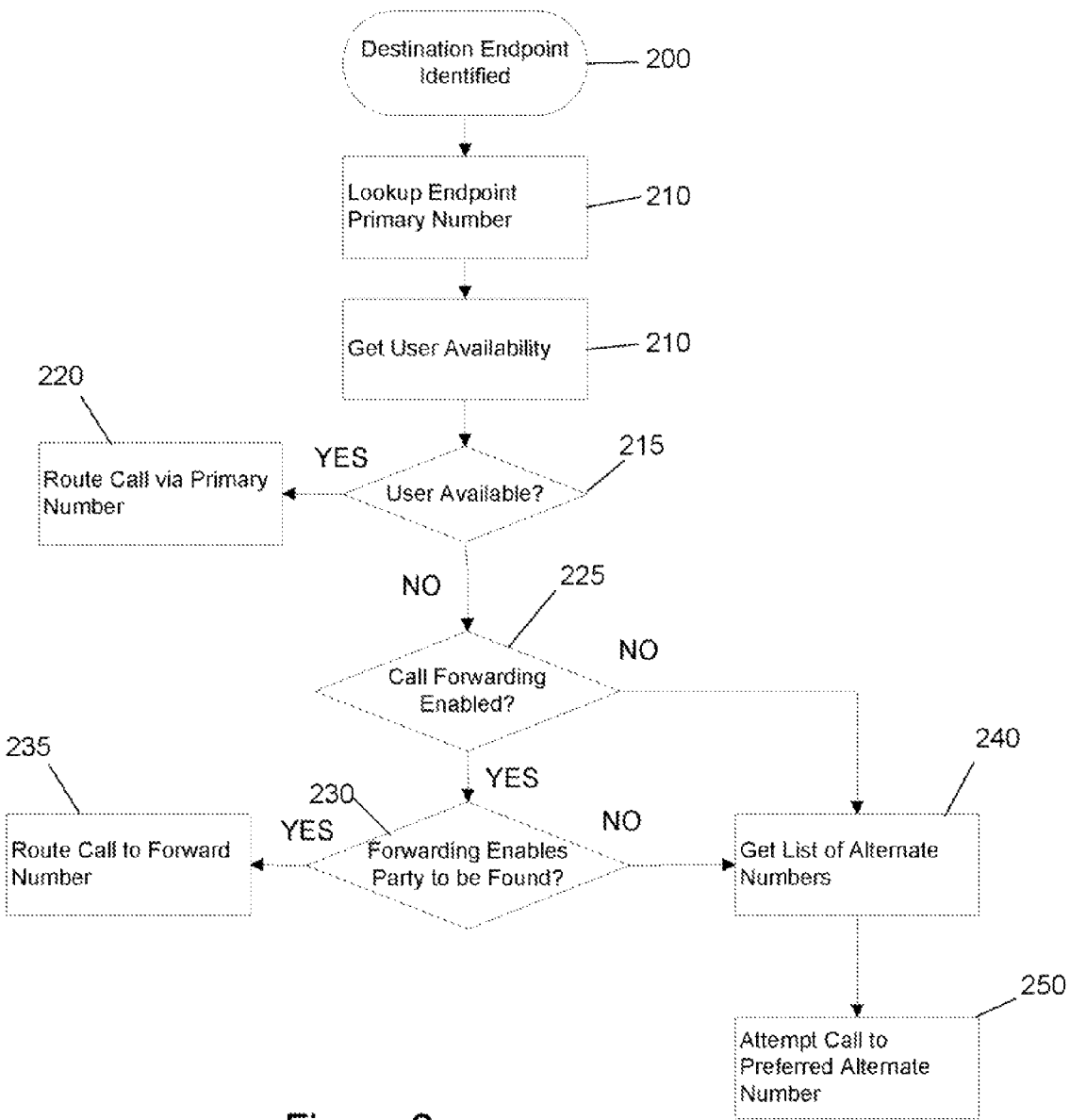
FIG. 2 is a flowchart of a method for initiating calls using availability information according to an embodiment.

Referring now to FIG. 2, there is shown a flow chart of a method for initiating calls using availability information, according to one embodiment of the present invention. The caller (e.g. at telephone device 120) first identifies the end point (e.g. telephone device 100) that he/she wishes to reach (step 200). This may be done in multiple ways. For example, the caller may depress a speed dial button on telephone device 120, enter an identity in a dial-by-name feature or speak an identifying phase for a speech recognition system. The caller can also dial a local or external number.

At step 210, the telephony switch 140 determines the end point that the caller wishes to reach, based on the destination information entered at step 200. For example, caller-entered speed dial indication, dial-by-name, etc., are processed to determine an end point identity. Where the primary numbered is directly entered by the caller, step 210 is a 'null' operation. Once the desired endpoint has been identified, a database such as database 190 (or other data structures or systems) is accessed to obtain information about the active features and preferences of the end point to be called, as well as the primary directory number that can be used for routing to the end point identified by the speed dial or dial by name entry at step 200. The database and/or systems may form part of the telephony switch 140 local to the caller or remote network resources such as ENUM (the IETF standard for DNS-based call routing directories) or presence server 180.

With end point identity established, the end point availability status information is accessed from presence server 180 (or an equivalent source such as a network server), at step 210. Alternatively, availability information may be obtained from a remote networked IM (instant messaging) presence server. If the availability status indicates that the called party is available at the primary number, (i.e. a YES at step 215), then call processing carries on as normal (step 220). Otherwise (i.e. a NO at step 215), if availability status indicates that the called party is not available at the primary number (e.g. out for lunch, out of office, back later, etc.) then a determination is made as to whether call forwarding has been enabled at the endpoint identified by the primary number (step 225). In the case of FIG. 1, where the number is dialed on local switch 140, the forwarding information is available within the switch. In the case of calls made across a network, such as the Internet, an extension of the call set up protocol is initiated to obtain this information from a remote switch or database. Alternatively this information may be stored in a networked presence server, such as the server 180, in or database such as ENUM or DNS. In general, the forwarding information may be queried from any available database wherever it has been instantiated.

Some forwarding allows the called party to be found whereas other types of forwarding does not allow the called party to be found. For example, Call Forwarding Always and Call Forwarding on No Answer to a non-voice mail number may be assumed to be able to reach the called party. Thus, once it has been determined that the user is not available at his primary number and the called party has programmed his/her call forwarding feature to forward calls to a non-voice mail number (i.e. a YES at step 230), then call processing follows the active call forwarding feature (step 235).

However, if Call Forward on Busy or Call Forward on No Answer to Voice Mail is active on the called party's line it will not be possible to find the called party. In this case (i.e. a NO at step 230), then a call to an alternate number may be attempted.

Access is made to database 190 in which the alternate numbers are kept (step 240). This database may be of several forms and may either be local stored, as shown in FIG. 1, networked or a combination of local and networked. For example, alternate numbers for non-local users may be kept in a networked resource such as an ENUM or DNS server. Furthermore, alternate numbers may be stored in separate databases for each potential caller. Thus each caller can have his/her own list of alternate numbers for each potential called party. For the case where the called number is selected by a speed dial key, the alternate numbers may be stored in the data structure associated with the speed dial feature (i.e. in telephony switch 140).

As indicated above, a called party may have multiple alternate numbers that can be selected based on his/her availability status. For example, a called party may associate a first alternate number for cellular telephone 177 when he/she is "At Lunch" and a second alternate number for home phone 179 when he/she is "Out of the Office", or no alternate number when "At Home" or "On Vacation".

Once the preferred alternate number has been obtained, a call is attempted (step 250). Since a call to an alternate number is likely to be more intrusive than a call to the primary number, an indication may be given to the caller that a more intrusive connection is being attempted (e.g. a special ringing tone, a phone or desktop display, or a combination of the foregoing).

The database 190 used to store the alternate numbers may be maintained by the calling party, the called party, a system administrator or any combination of the foregoing. A single database 190 may be provided for all parties, or multiple databases may be provided for local and network parties. The information stored in database 190 is a list of preferred alternate numbers which, according to one embodiment, is indexed by availability status. For example, when the called party's presence is "At Lunch" his/her cellular telephone 177 may be associated as the preferred alternate number, and when the called party's presence is "At Home" his/her home telephone 179 may be associated with the preferred alternate number. The storage of multiple alternate numbers and the indexing by availability status represent only two of multiple alternative embodiments. For example, only one alternate number may be stored in the database 190 with no indexing by availability status.

Although embodiments of the invention have been described and illustrated in detail, it will be appreciated that various modifications and changes can be made, all of which are believed to be within the scope of the invention as defined by the claims appended hereto.

What is claimed is:

1. A system for initiating a call by a caller to a called party on at least one alternate number, comprising:
    an endpoint for communicating with the called party via a primary number;
    at least one other endpoint for communicating with the called party via at least one alternate number;
    at least one database for storing a list of numbers including said primary number and said at least one alternate number, each said caller having their own list of alternate numbers for each called party;
    a presence server for tracking presence status of said called party; and
    a switch for obtaining said primary number from said database and said presence status of said called party from said presence server and in the event said called party is available then routing said call to said endpoint via said primary number, and otherwise determining whether call forwarding is enabled for said endpoint and in the event call forwarding is not enabled or call forwarding is enabled but does not permit said called party to be found then accessing said at least one alternate number from said caller list indexed by availability status of said called party in said database and routing said call to said other endpoint via said alternate number, and in the event calf forwarding is enabled and permits said called party to be found then routing said call in accordance with said call forwarding.

2. The system of claim 1, wherein said call forwarding that does not permit said called party to be found includes Call Forward on Busy and Call Forward on No Answer to Voice Mail.

3. The system of claim 1, wherein said call forwarding that permits said called party to be found includes Call Forwarding Always and Call Forwarding on No Answer to a non-voice mail number.

4. The system of claim 1, wherein said at least one alternate number is one of multiple alternate numbers that is selected based on particulars of said presence status.

5. The system of claim 4, wherein said multiple alternate numbers are indexed in said database by said particulars of said presence status.

6. The system of claim 1, wherein said switch provides said called party with an indication that said call is being routed via said alternate number.

7. The system of claim 6, wherein said indication is at least one of a special ringing tone and a visual indication on a display of said another endpoint.

8. The system of claim 1, wherein said database is a remote network resource.

9. The system of claim 8, wherein said remote network resource is ENUM.

10. The system of claim 4, wherein said at least one database is connected to said switch one of either locally via a LAN, remotely via an external network or distributed between said LAN and external network.

11. The system of claim 8, wherein remote network resource is a DNS server.

12. The system of claim 4, wherein said alternate numbers are stored in separate ones of said at least one database for individual callers.

13. The system of claim 4, wherein said alternate numbers are stored in a data structure associated with a speed dial feature for a calling party.

14. The system of claim 1, wherein said database is maintained by a calling party.

15. The system of claim 1, wherein said database is maintained by said called party.

16. The system of claim 1, wherein said database is maintained by a system administrator.

17. The method of claim 1, wherein said presence status includes at least one of "At Lunch", "Out of the Office", "At Home", or "On Vacation."

18. The system of claim 1, wherein said presence status includes at least one of "At Lunch", "Out of the Office", "At Home", or "On Vacation."

* * * * *